US009502766B2

(12) United States Patent
LaPat

(10) Patent No.: US 9,502,766 B2
(45) Date of Patent: Nov. 22, 2016

(54) ELECTRONICALLY RECONFIGURABLE, PIECEWISE-LINEAR, SCALABLE ANALOG MONOPULSE NETWORK

(71) Applicant: RAYTHEON COMPANY, Waltham, MA (US)

(72) Inventor: Ronald H. LaPat, Sudbury, MA (US)

(73) Assignee: RAYTHEON COMPANY, Waltham, MA (US)

( * ) Notice: Subject to any disclaimer, the term of this patent is extended or adjusted under 35 U.S.C. 154(b) by 305 days.

(21) Appl. No.: 14/341,648

(22) Filed: Jul. 25, 2014

(65) Prior Publication Data

US 2016/0028155 A1    Jan. 28, 2016

(51) Int. Cl.
| H01Q 3/34 | (2006.01) |
| H01Q 25/02 | (2006.01) |
| G01S 13/44 | (2006.01) |
| H01Q 3/26 | (2006.01) |
| H01Q 21/22 | (2006.01) |
| H01Q 3/00 | (2006.01) |
| H01Q 25/00 | (2006.01) |

(52) U.S. Cl.
CPC ............. *H01Q 3/34* (2013.01); *G01S 13/4463* (2013.01); *H01Q 3/26* (2013.01); *H01Q 21/22* (2013.01); *H01Q 25/02* (2013.01)

(58) Field of Classification Search
CPC ............ H01Q 3/26; H01Q 3/30; H01Q 3/34; H01Q 21/06; H01Q 21/22; H01Q 25/02; G01S 13/02; G01S 13/06; G01S 13/42; G01S 13/44; G01S 13/4463
See application file for complete search history.

(56) References Cited

U.S. PATENT DOCUMENTS

| 4,642,645 | A | | 2/1987 | Haupt | |
|---|---|---|---|---|---|
| 5,017,927 | A | * | 5/1991 | Agrawal | ............. G01S 13/4463 342/154 |
| 5,166,690 | A | | 11/1992 | Carlson et al. | |
| 5,216,428 | A | | 6/1993 | DuFort | |
| 5,274,384 | A | * | 12/1993 | Hussain | .................... H01Q 3/26 342/153 |
| 5,600,326 | A | * | 2/1997 | Yu | .......................... G01S 7/2813 342/149 |
| 6,483,478 | B2 | * | 11/2002 | Yu | ........................ G01S 13/4436 342/372 |
| 6,661,366 | B2 | * | 12/2003 | Yu | ........................ G01S 13/4463 342/13 |
| 6,697,009 | B2 | * | 2/2004 | Yu | ........................ G01S 13/4463 342/13 |
| 6,720,910 | B2 | * | 4/2004 | Yu | ........................ G01S 13/4463 342/152 |

(Continued)

FOREIGN PATENT DOCUMENTS

JP    2012 175469 A    9/2012

OTHER PUBLICATIONS

Barker et al., "Ku Band Linear Phased Array", Microwave J., vol. 20, No. 10, Oct. 1, 1977 (pp. 44-46).

(Continued)

*Primary Examiner* — Bernarr Gregory
(74) *Attorney, Agent, or Firm* — Lewis Roca Rothgerber Christie LLP

(57) ABSTRACT

A monopulse beam former for an array antenna composed of a plurality of sub-arrays. In one embodiment, a monopulse beam former includes, for each sub-array, a sum feed network and a delta feed network, each feeding an analog processor. The delta beam former includes a plurality of couplers with coupling coefficients increasing linearly across the sub-array. The analog processor includes a first gain-phase module in line with the output of the delta feed network, and a second gain-phase module adjusting the gain and phase of a portion of the output of the sum feed network added to the delta signal. The gain settings and phase settings of the first and second gain-phase modules are adjusted to provide a piecewise-linear approximation to a desired antenna pattern.

20 Claims, 5 Drawing Sheets

(56) References Cited

U.S. PATENT DOCUMENTS

| | | | |
|---|---|---|---|
| 6,930,637 B2* | 8/2005 | Brothers, Jr. | H01Q 25/02 342/377 |
| 7,671,789 B1* | 3/2010 | Yu | G01S 13/4463 342/152 |
| 8,427,371 B2 | 4/2013 | Pozgay | |
| 2003/0184473 A1* | 10/2003 | Yu | G01S 13/4463 342/380 |
| 2011/0248796 A1 | 10/2011 | Pozgay | |
| 2013/0088381 A1 | 4/2013 | Puzella et al. | |

OTHER PUBLICATIONS

Written Opinion of the International Searching Authority for International Application No. PCT/US2015/036838, filed Jun. 20, 2015, Written Opinion of the International Searching Authority mailed Sep. 11, 2015 (9 pgs.).

International Search Report for International Application No. PCT/US2015/036838, filed Jun. 20, 2015, International Search Report dated Sep. 4, 2015 and mailed Sep. 11, 2015 (4 pgs.).

* cited by examiner

ELECTRONICALLY RECONFIGURABLE, PIECEWISE-LINEAR, SCALABLE ANALOG MONOPULSE NETWORK

BACKGROUND

1. Field

One or more aspects of embodiments according to the present invention relate to monopulse radar, and more particularly to a system and method for forming a monopulse radar delta beam using piecewise-linear weights.

2. Description of Related Art

Monopulse radar systems illuminate a target and receive the radar return with several different receiving antenna patterns, referred to as a sum beam, and one or more delta beams. A delta beam may have an antenna pattern with a null and phase reversal in the center of the pattern, so that the magnitude of the return in the delta beam provides a measure of the magnitude of the misalignment between the line of sight to the target and the center of the delta beam, and the phase of the delta beam return relative to the phase of the sum beam return provides an indication of the direction in which the line of sight to the target is misaligned with the center of the delta beam. Two delta beams may be used, one to measure misalignment in azimuth, for example, and one to measure misalignment in elevation.

A monopulse radar antenna may be an array antenna composed of a number of sub-arrays installed side by side, with a set of array element weights for each beam. The sum beam may be formed with a set of weights referred to as the sum weights, and a delta beam may be formed by applying an additional set of weights, referred to as the delta over sum (D/S) weights, so that each weight used in forming the delta beam is the product of a sum weight and a delta over sum weight. In related art systems, the delta over sum weights may differ from sub-array to sub-array, resulting in high manufacturing and maintenance costs associated with fabricating and maintaining a large number of distinct parts. In one related art approach, the sub-arrays are made identical and the delta over sum weights increase linearly across the array, with a single programmable weight per sub-array being the only difference between sub-arrays. This approach results in a reduction in manufacturing and maintenance costs, but these benefits are obtained at a cost in performance, e.g., in higher sidelobe levels (SLL).

Thus, there is a need for a monopulse radar system that provides good performance, and is constructed using identical sub-arrays.

SUMMARY

A monopulse beam former for an array antenna composed of a plurality of sub-arrays includes, in one embodiment, for each sub-array, a sum feed network and a delta feed network, each feeding an analog processor. The delta feed network includes a plurality of couplers with coupling coefficients increasing linearly across the sub-array. The analog processor includes a first gain-phase module in line with the output of the delta feed network, and a second gain-phase module adjusting the gain and phase of a portion of the output of the sum feed network added to the delta signal. The gain settings and phase settings of the first and second gain-phase modules are adjusted to provide a piecewise-linear approximation to a desired antenna pattern.

According to an embodiment of the present invention there is provided a beam former for monopulse beam forming in a phased array antenna including a first sub-array including a first plurality of antenna elements and a second sub-array including a second plurality of antenna elements, the beam former including: a sum beam former connected to the first plurality of antenna elements and the second plurality of antenna elements, and including an array sum output, a first delta sub-array beam former including: a first delta feed network connected to the first plurality of antenna elements; and a first inline gain-phase module connected to an output of the first delta feed network, the first delta sub-array beam former being configured to provide a first plurality of delta over sum (D/S) weights with respect to the sum beam former, the first plurality of D/S weights varying substantially linearly, with a first gain increment, across the first sub-array; a second delta sub-array beam former including: a second delta feed network connected to the second plurality of antenna elements; and a second inline gain-phase module connected to an output of the second delta feed network, the second delta sub-array beam former being configured to provide a second plurality of D/S weights with respect to the sum beam former, the second plurality of D/S weights varying substantially linearly, with a second gain increment, across the second sub-array; the first and second inline gain-phase modules being configured to provide a first gain increment and a second gain increment differing by at least 2 decibels (dB).

In one embodiment, the first inline gain-phase module is a monolithic microwave integrated circuit (MMIC), and the second inline gain-phase module is a MMIC.

In one embodiment, the first sub-array and the second sub-array are adjacent sub-arrays of the phased array; the sum beam former includes a first sub-array sum beam former and a second sub-array sum beam former connected to the first sub-array and the second sub-array respectively; the beam former includes: a first cross gain-phase module connected to an output of the first sub-array sum beam former and to a first cross combiner, the first cross combiner configured to add the output of the first cross gain-phase module and the output of the first inline gain-phase module; and a second cross gain-phase module connected to an output of the second sub-array sum beam former and to a second cross combiner, the second cross combiner configured to add the output of the second cross gain-phase module and the output of the second inline gain-phase module; the first inline gain-phase module, the second inline gain-phase module, the first cross gain-phase module and the second cross gain-phase module configured to provide: a D/S weight for a first antenna element, differing from a D/S weight for a second antenna element adjacent to the first antenna element in the phased array antenna by an amount less than the first gain increment and less than the second gain increment.

In one embodiment, the first cross gain-phase module is a MMIC and the second cross gain-phase module is a MMIC.

In one embodiment, each of: the first inline gain-phase module; the second inline gain-phase module; the first cross gain-phase module; and the second cross gain-phase module includes a phase shifter, for applying a phase change to a signal propagating through the gain-phase module.

In one embodiment, each phase shifter includes a non-transitory digital storage medium storing a phase setting, the gain-phase module including the phase shifter configured to apply a phase change corresponding to the phase setting to a signal propagating through the gain-phase module.

In one embodiment, the difference between the phase setting of the first inline gain-phase module and the phase setting of the second inline gain-phase module corresponds to substantially 180 degrees of phase.

In one embodiment, each of: the first inline gain-phase module; the second inline gain-phase module; the first cross gain-phase module; and the second cross gain-phase module includes a gain control, for applying a gain change to a signal propagating through the gain-phase module.

In one embodiment, each gain control includes a non-transitory digital storage medium storing a gain setting, the gain-phase module including the gain control being configured to apply a gain change corresponding to the gain setting to a signal propagating through the gain-phase module.

In one embodiment, the first inline gain-phase module; the second inline gain-phase module; the first cross gain-phase module; and the second cross gain-phase module are configured to provide a plurality of D/S weights that form a piecewise-linear approximation to a desired weighting function.

In one embodiment, the desired weighting function is a Bayliss-Taylor weighting function.

In one embodiment, the sum beam former includes a first sum feed network connected to the first plurality of antenna elements; and the beam former includes a first analog processor, the first analog processor including: the first inline gain-phase module; the first cross gain-phase module; a sum input connected to a first sum feed network; a delta input connected to the first delta feed network; a sum output; and a delta output.

In one embodiment, the first analog processor includes: a low-noise amplifier connected to the sum input, and configured to amplify a signal received by the analog processor at the sum input; and a low-noise amplifier connected to the delta input, and configured to amplify a signal received by the analog processor at the delta input.

In one embodiment, the first analog processor includes a transmit signal path.

In one embodiment, the sum input of the first analog processor is configured to operate as a transmit output of the first analog processor.

In one embodiment, the first analog processor includes a circulator connected to the sum input of the first analog processor and configured to separate signals received at the sum input from signals transmitted through the sum input.

In one embodiment, the first sub-array includes 8 antenna elements and the second sub-array includes 8 antenna elements.

In one embodiment, the first sub-array includes 16 antenna elements and the second sub-array includes 16 antenna elements.

In one embodiment, the first delta feed network includes a plurality of couplers, each of the plurality of couplers connected to a respective antenna element of the plurality of antenna elements of the first sub-array.

In one embodiment, each of the plurality of couplers has a coupling coefficient, the coupling coefficients increasing linearly with the position of corresponding antenna elements in the first sub-array.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of an electronically reconfigurable, piecewise-linear, scalable analog monopulse network provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
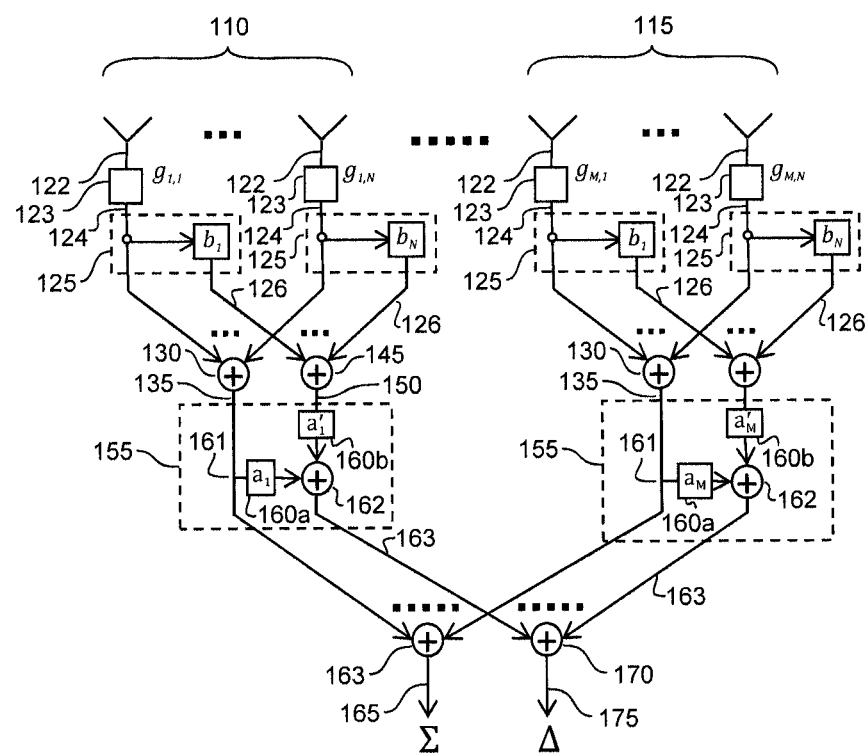
FIG. 1 is a block diagram of an array antenna and beam former according to an embodiment of the present invention.

Referring to FIG. 1, in one embodiment a first sub-array 110 of antenna elements and a second sub-array 115 of antenna elements are part of an array, which may include additional sub-arrays. Signals received at each antenna element output 122 are amplified and phase shifted by an element gain block 123 and fed to a coupler 125, at a coupler input 124. The signal at the coupler input 124 is split, by the coupler 125, into a sum beam contribution, at the output port of the coupler 125, and a delta beam contribution 126, at the coupled port of the coupler 125. The sum beam contributions are added in a sub-array sum combiner 130, which may for example be a corporate feed network with multiple 2:1 combiners, to form the output 135 of the sum feed network. The amplitude of the $i^{th}$ delta beam contribution 126 is proportional to the coupling coefficient $b_i$ in the corresponding coupler 125. The delta beam contributions are added in a sub-array delta combiner 145, which may for example be a corporate feed network with multiple 2:1 combiners, to form the output 150 of the delta feed network.

As used herein, the "delta feed network" is the network that has, as inputs, the plurality of coupler inputs 124, and that has a single output, the output 150 of the delta feed network. As used herein, the "sum feed network" is the network that has the plurality of antenna element outputs 122 as inputs and a single output, the output 135 of the sum feed network. Thus, the delta feed network and the sum feed network both include the couplers, as shared elements. As used herein terminals of two elements are "connected" if they are directly or indirectly connected. For example, each coupled port 126 is connected to a respective antenna element through a respective coupler 125 and through a respective element gain block 123.

The output 135 of the sum feed network and the output 150 of the delta feed network are fed into respective inputs of an analog processor 155, the inputs being referred to herein as the sum input and the delta input, respectively, of the analog processor 155. Within the analog processor, gain-phase modules 160a, 160b change the amplitude and phase of signals propagating through them, i.e., each gain-phase module includes a gain control that applies a gain to a signal passing through it, increasing or decreasing (if the gain is less than 1) the amplitude of the signal. The gain-phase module also includes a phase shifter that may apply a phase change to the signal. In the embodiment of FIG. 1, a portion of the signal at the sum input of the analog processor 155 is split off by a power divider 161 (illustrated as a tee) and this portion is processed by a gain-phase module 160a, referred to herein as a cross gain-phase module 160a. The remainder of the signal at the sum input of the analog processor 155 forms the signal at an output, referred to as the sum output, of the analog processor 155. The signal at the delta input of the analog processor 155 is processed by another gain-phase module 160b, referred to herein as an inline gain-phase module 160b and the outputs of the cross gain-phase module 160a and the inline gain-phase module 160b are added, i.e., combined, in a power combiner referred to as a cross combiner 162, to form the signal at an output of the analog processor 155, referred to as the processor delta output 163. In one embodiment the cross gain-phase module 160a and the inline gain-phase module 160b are electronically adjustable, each containing a non-transitory digital storage medium (e.g., volatile or non-volatile random-access memory (RAM), or an array of flip-flops) storing a first digital number, which determines the gain setting of the gain-phase module 160a, 160b, and a second digital number which determines the phase setting of the gain-phase module 160a, 160b.

The sum outputs of the analog processors 155, each associated with a sub-array of the array, are, in one embodiment, added in an array sum combiner 164 to form the array sum output 165, and the delta outputs of the analog processors 155 associated with all of the sub-arrays in the array are added in an array delta combiner 170 to form the array delta output 175. Each of the array sum combiner 164 and the array delta combiner 170 may for example be a corporate feed network with multiple 2:1 combiners.

The circuitry connecting the antenna elements of the first sub-array 110 or the second sub-array 115 to the sum output of the corresponding analog processor 155 is referred to herein as the first or second sub-array sum beam former, respectively. The circuitry connecting the antenna elements of the first sub-array 110 or the second sub-array 115 to the corresponding processor delta output 163 is referred to herein as the first or second sub-array delta beam former, respectively. The circuitry connecting the antenna elements of the first sub-array 110 and of the second sub-array 115 to the array sum output 165 is referred to herein as the sum beam former, and the circuitry connecting the antenna elements of the first sub-array 110 and of the second sub-array 115 to the array delta output 175 is referred to herein as the delta beam former. The combination of the sum beam former and the delta beam former is referred to herein as the beam former.

The signal at the array sum output 165 is a linear combination, i.e., a weighted sum, of the element outputs 122, and the gain from each of the element outputs 122 to the array sum output 165 may be referred to as a sum weight. Similarly, the gain from each of the element outputs 122 to the array delta output 175 may be referred to as a delta weight. The delta weights include the gains of the element gain blocks 123, which are used to form and steer the sum beam. The delta weights differ from the sum weights as a result of contributions from, e.g., the coupling coefficients $b_i$, the gains of the cross gain-phase modules 160a, and the inline gain-phase modules 160b. The ratios of the delta weights to the respective sum weights may be referred to as the delta over sum weights, or D/S weights.

In one embodiment the couplers 125 are designed so that their respective coupling coefficients increase linearly with position across the sub-array, i.e., so that the gain from the coupler input 124 to the processor delta output 163 differs, for any pair of adjacent antenna elements, by a gain increment, which is the same for each pair of adjacent antenna elements. Consequently the D/S weights also vary linearly, with the gain increment, across the sub-array. The gain increment is proportional to the gain of the inline gain-phase module 160b, and it may be positive or negative depending on the phase setting of the inline gain-phase module 160b. The inline gain-phase module 160b may have a nominal setting, e.g., a gain setting that is at the midpoint of the range of gain settings available in the inline gain-phase module 160b. The gain increment corresponding to the nominal gain setting of the gain-phase module 160b is referred to herein as the nominal gain increment.

If the coupling coefficients of the couplers 125 increase linearly with position across each sub-array, then the gain settings of the cross gain-phase modules 160a may be selected to cause the gain to increase linearly across the entire array. In particular, this may be done by selecting the gains of the cross gain-phase modules 160a to increase linearly across the array in the same direction as the direction in which the coupling coefficients increase linearly with position across the sub-array, with the gain of each cross gain-phase module 160a differing from the gain of the cross gain-phase module 160a of an adjacent sub-array by N times the gain increment, where N is the number of elements in each sub-array. In this antenna configuration, the gains of the inline gain-phase modules 160b may be set to one, or to a uniform value that is the same for all sub-arrays, or they may be adjusted to compensate for differences between the sub-arrays resulting, for example, from non-uniformity or imperfections in the manufacturing process. For example, if as a result of such imperfections the nominal gain increment of the first sub-array 110 is greater, by some ratio, than the nominal gain increment of the second sub-array 115, the gain of the inline gain-phase module 160b corresponding to the first sub-array 110 may be made less than the gain of the inline gain-phase module 160b corresponding to the second sub-array 115 by the same ratio, to compensate for the imperfections. This set of delta over sum weights, referred to herein as derivative weights, which increase linearly across the entire array, may be used to form a delta antenna pattern, but it may result in undesirable beam characteristics, e.g., side lobe levels (SLLs) that are higher than desired.

Figure 2A:
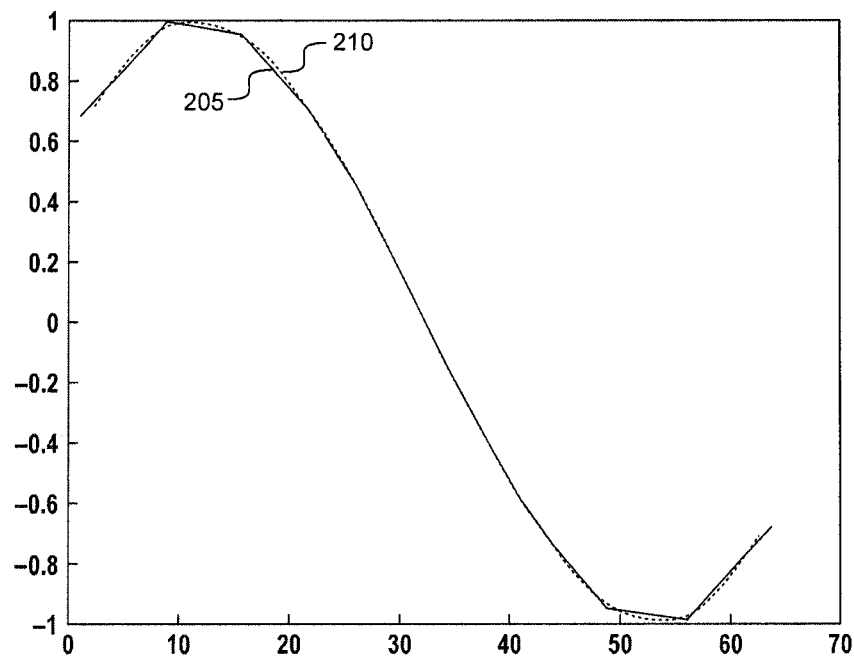
FIG. 2A is a graph of Bayliss-Taylor weights and of a piecewise-linear approximation to Bayliss-Taylor weights, according to an embodiment of the present invention.
Figure 2B:
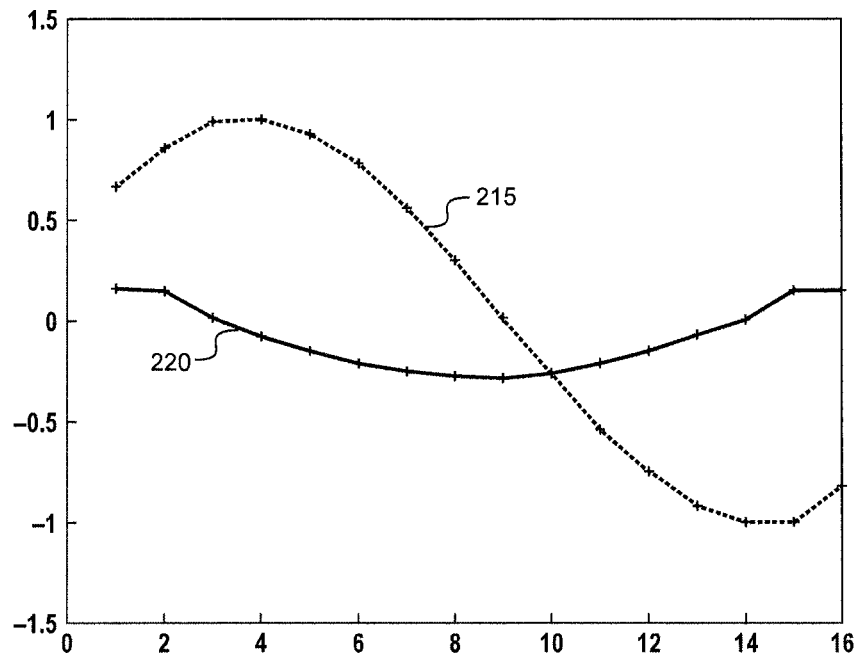
FIG. 2B is a graph of gain-phase module gain settings for two sets of gain-phase modules, used to form the piecewise linear weights of FIG. 2A, in one embodiment of the present invention.

In one embodiment, the gains of the cross gain-phase modules 160a and of the inline gain-phase modules 160b may be selected to form a D/S weight profile across the array that is piecewise linear. As used herein, the term piecewise linear refers to a function that is composed of at least two linear segments, with at least two of the segments not being colinear, e.g., having a substantially different slope. In one embodiment, the slope between a pair of segments in the piecewise linear D/S weight profile across the array may differ by at least 2 dB. Referring to FIGS. 2A and 2B, in this embodiment, the D/S weights may form a piecewise linear function 205 approximating a desired D/S weighting function 210, which may for example be a Bayliss-Taylor D/S weighting function, known to those of skill in the art as a weighting function producing a low SLL for a given beam width. The piecewise linear function 205 may for example be implemented using gains shown in FIG. 2B. In FIG. 2B, a first curve 215 shows suitable gains for the cross gain-phase modules 160a and a second curve 220 shows suitable gains for the inline gain-phase modules 160b, for achieving the piecewise-linear weight profile of FIG. 2A. A negative gains, i.e., a gain less than 0, may be achieved by selecting a phase setting in a cross gain-phase module 160a or an inline gain-phase module 160b that differs by 180 degrees from the phase setting of a corresponding cross gain-phase module 160a or inline gain-phase module 160b with positive gain. It may be advantageous to use a D/S weight profile that is both piecewise linear and continuous, so that the D/S weight for an antenna element at the edge of a first sub-array configured with a slope corresponding to a first gain increment differs from the D/S weight for an adjacent antenna element at the edge of an adjacent sub-array configured with a slope corresponding to a second gain increment, by an amount less than or substantially equal to the larger of the two gain increments.

Figure 3:
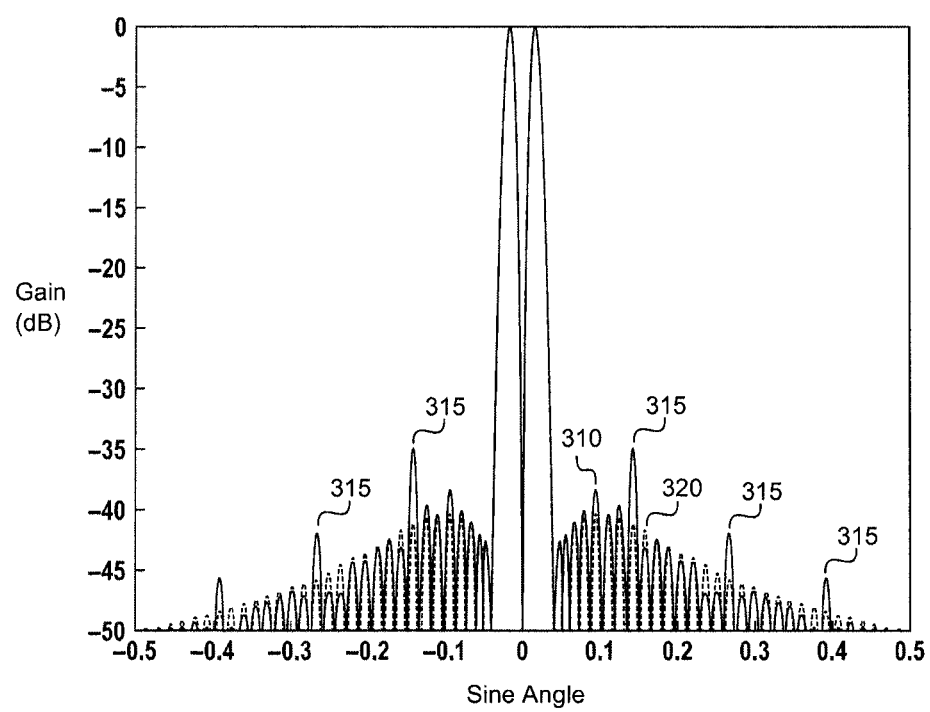
FIG. 3 is a graph of a delta antenna pattern formed using Bayliss-Taylor weights and a delta antenna pattern formed using a piecewise linear approximation to Bayliss-Taylor weights over 8 sub-arrays, according to an embodiment of the present invention.

Referring to FIG. 3, the side lobe levels of the piecewise linear delta antenna pattern 310 may be a close approximation to that corresponding to 40 dB Bayliss-Taylor weights, with the exception of a small number of lobes, referred to as grating lobes 315, that are higher in the antenna pattern resulting from piecewise linear weights than in the antenna pattern resulting from Bayliss-Taylor weights. The antenna patterns illustrated in FIG. 3 are calculated for 128 antenna elements, in 8 sub-arrays (with 16 elements per sub-array), i.e., the piecewise linear weighting function is composed of 8 linear segments.

Figure 4:
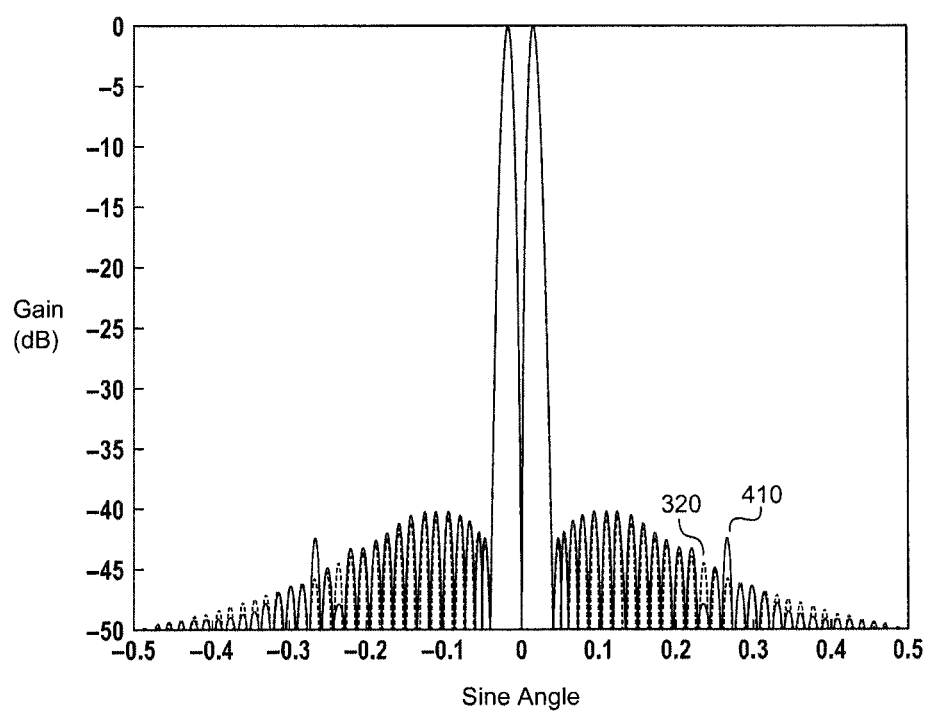
FIG. 4 is a graph of a delta antenna pattern formed using Bayliss-Taylor weights and a delta antenna pattern formed using a piecewise linear approximation to Bayliss-Taylor weights over 16 sub-arrays, according to an embodiment of the present invention.

Referring to FIG. 4, an antenna pattern 410 resulting from piecewise linear weights formed over an antenna with 128 elements in 16 sub-arrays (with 8 elements per sub-array) has significantly attenuated grating lobes compared to the antenna pattern 310 of FIG. 3, resulting from piecewise linear weights formed over an antenna with 128 elements in 8 sub-arrays. The sidelobe levels of the antenna pattern 410 of FIG. 4, resulting from piecewise linear weights, are at nearly all angles approximately 7.5 dB lower than those for an antenna pattern resulting from derivative weights.

Figure 5:
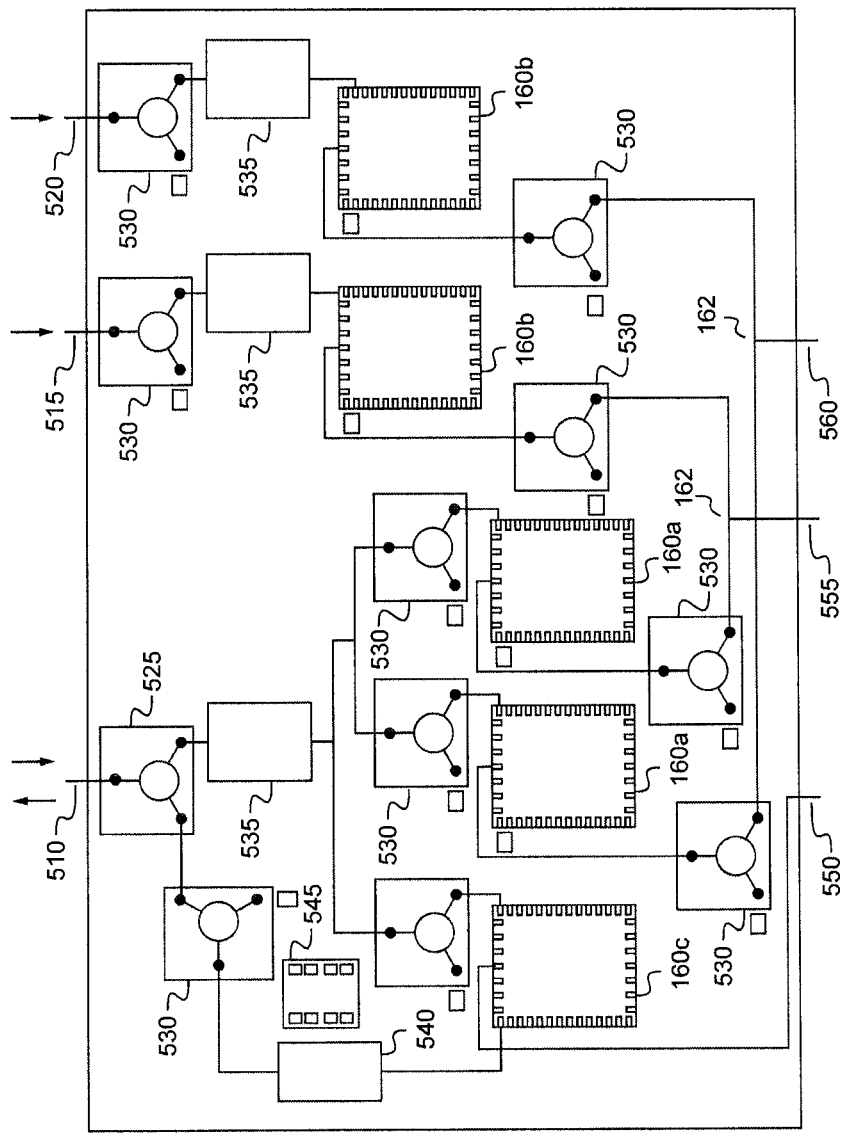
FIG. 5 is a printed wiring board layout of an analog processor according to an embodiment of the present invention.

Embodiments of the present invention may be used to provide two delta signals, e.g., an azimuth delta signal and an elevation delta signal, simultaneously, by processing azimuth arrays and elevation arrays in parallel. Referring to FIG. 5, in one embodiment an analog processor 155 is fabricated as a printed wiring board with a layout as shown. The analog processor has a sum input 510 and two delta inputs, an elevation delta input 515, and an azimuth delta input 520. In the embodiment of FIG. 5, the sum input 510 also functions, when the antenna is transmitting, as a transmit output; separation of received and transmitted signals is accomplished by the circulator 525. Isolators 530, each of which may be a circulator with a terminated terminal, are used for isolation throughout the circuit. Low-noise amplifiers (LNAs) 535 are used to amplify the received signals, and a power amplifier 540, under the control of a control circuit 545, is used to amplify the transmitted signal. The analog processor 155 has a sum output 550, an elevation delta output 555, and an azimuth delta output 560. The sum output 550 also serves as a transmit input for receiving a signal to be transmitted when the antenna is operating in transmit mode.

Five gain-phase modules 160a-160c, implemented as monolithic microwave integrated circuits (MMICs) referred to as common leg circuits (CLCs), provide gain and phase control. In the elevation delta signal path, an LNA 535 amplifies the signal received by the analog processor 155 at the elevation delta input 515, and an inline gain-phase module 160b adjusts the gain and phase of the signal, which then propagates through an isolator 530 to a cross combiner 162. The signal at the sum input 510 is amplified by an LNA 535, is split, and propagates through three isolators 530. A cross gain-phase module 160a then adjusts the gain and phase of one of these three signals, which then propagates through an isolator 530, to be added to the processed elevation delta signal by the cross combiner 162. The azimuth delta signal is processed similarly by a respective LNA 535, respective isolators 530, and a respective inline gain-phase module 160b, and it is combined with a second one of the three sum signals resulting from splitting after the LNA 535 in the sum signal path. The third one of the three sum signals resulting from splitting after the LNA 535 in the sum signal path is processed by a sum gain-phase module 160c, and routed to the sum output 550 of the analog processor 155.

Although limited embodiments of an electronically reconfigurable, piecewise-linear, scalable analog monopulse network have been specifically described and illustrated herein, many modifications and variations will be apparent to those skilled in the art. Accordingly, it is to be understood that an electronically reconfigurable, piecewise-linear, scalable analog monopulse network employed according to principles of this invention may be embodied other than as specifically described herein. The invention is also defined in the following claims, and equivalents thereof.

What is claimed is:

1. A beam former for monopulse beam forming in a phased array antenna comprising a first sub-array comprising a first plurality of antenna elements and a second sub-array comprising a second plurality of antenna elements, the beam former comprising:
  a sum beam former connected to the first plurality of antenna elements and the second plurality of antenna elements, and comprising an array sum output,
  a first delta sub-array beam former comprising:
    a first delta feed network connected to the first plurality of antenna elements; and
    a first inline gain-phase module connected to an output of the first delta feed network,
  the first delta sub-array beam former being configured to provide a first plurality of delta over sum (D/S) weights with respect to the sum beam former, the first plurality of D/S weights varying substantially linearly, with a first gain increment, across the first sub-array;
  a second delta sub-array beam former comprising:
    a second delta feed network connected to the second plurality of antenna elements; and
    a second inline gain-phase module connected to an output of the second delta feed network,
  the second delta sub-array beam former being configured to provide a second plurality of D/S weights with respect to the sum beam former, the second plurality of D/S weights varying substantially linearly, with a second gain increment, across the second sub-array;
  the first and second inline gain-phase modules being configured to provide a first gain increment and a second gain increment differing by at least 2 decibels (dB).

2. The beam former of claim 1, wherein the first inline gain-phase module is a monolithic microwave integrated circuit (MMIC), and the second inline gain-phase module is a MMIC.

3. The beam former of claim 1, wherein:
the first sub-array and the second sub-array are adjacent sub-arrays of the phased array;
the sum beam former comprises a first sub-array sum beam former and a second sub-array sum beam former connected to the first sub-array and the second sub-array respectively;
the beam former comprises:
a first cross gain-phase module connected to an output of the first sub-array sum beam former and to a first cross combiner, the first cross combiner configured to add the output of the first cross gain-phase module and the output of the first inline gain-phase module; and
a second cross gain-phase module connected to an output of the second sub-array sum beam former and to a second cross combiner, the second cross combiner configured to add the output of the second cross gain-phase module and the output of the second inline gain-phase module;
the first inline gain-phase module, the second inline gain-phase module, the first cross gain-phase module and the second cross gain-phase module configured to provide:
a D/S weight for a first antenna element, differing from a D/S weight for a second antenna element adjacent to the first antenna element in the phased array antenna by an amount less than the first gain increment and less than the second gain increment.

4. The beam former of claim 3, wherein the first cross gain-phase module is a MMIC and the second cross gain-phase module is a MMIC.

5. The beam former of claim 3, wherein each of
the first inline gain-phase module;
the second inline gain-phase module;
the first cross gain-phase module; and
the second cross gain-phase module
comprises a phase shifter, for applying a phase change to a signal propagating through the gain-phase module.

6. The beam former of claim 5, wherein each phase shifter comprises a non-transitory digital storage medium storing a phase setting, the gain-phase module comprising the phase shifter configured to apply a phase change corresponding to the phase setting to a signal propagating through the gain-phase module.

7. The beam former of claim 6, wherein the difference between the phase setting of the first inline gain-phase module and the phase setting of the second inline gain-phase module corresponds to substantially 180 degrees of phase.

8. The beam former of claim 3, wherein each of:
the first inline gain-phase module;
the second inline gain-phase module;
the first cross gain-phase module; and
the second cross gain-phase module
comprises a gain control, for applying a gain change to a signal propagating through the gain-phase module.

9. The beam former of claim 8 wherein each gain control comprises a non-transitory digital storage medium storing a gain setting, the gain-phase module comprising the gain control being configured to apply a gain change corresponding to the gain setting to a signal propagating through the gain-phase module.

10. The beam former of claim 3, wherein:
the first inline gain-phase module;
the second inline gain-phase module;
the first cross gain-phase module; and
the second cross gain-phase module
are configured to provide a plurality of D/S weights that form a piecewise-linear approximation to a desired weighting function.

11. The beam former of claim 10, wherein the desired weighting function is a Bayliss-Taylor weighting function.

12. The beam former of claim 3, wherein:
the sum beam former comprises a first sum feed network connected to the first plurality of antenna elements; and
the beam former comprises a first analog processor, the first analog processor comprising:
the first inline gain-phase module;
the first cross gain-phase module;
a sum input connected to a first sum feed network;
a delta input connected to the first delta feed network;
a sum output; and
a delta output.

13. The beam former of claim 12, wherein the first analog processor comprises:
a low-noise amplifier connected to the sum input, and configured to amplify a signal received by the analog processor at the sum input; and
a low-noise amplifier connected to the delta input, and configured to amplify a signal received by the analog processor at the delta input.

14. The beam former of claim 12, wherein the first analog processor comprises a transmit signal path.

15. The beam former of claim 14, wherein the sum input of the first analog processor is configured to operate as a transmit output of the first analog processor.

16. The beam former of claim 15, wherein the first analog processor comprises a circulator connected to the sum input of the first analog processor and configured to separate signals received at the sum input from signals transmitted through the sum input.

17. The beam former of claim 1, wherein the first sub-array comprises 8 antenna elements and the second sub-array comprises 8 antenna elements.

18. The beam former of claim 1, wherein the first sub-array comprises 16 antenna elements and the second sub-array comprises 16 antenna elements.

19. The beam former of claim 1, wherein the first delta feed network comprises a plurality of couplers, each of the plurality of couplers connected to a respective antenna element of the plurality of antenna elements of the first sub-array.

20. The beam former of claim 19, wherein each of the plurality of couplers has a coupling coefficient, the coupling coefficients increasing linearly with the position of corresponding antenna elements in the first sub-array.

* * * * *